United States Patent [19]

German

[11] Patent Number: 4,686,504
[45] Date of Patent: Aug. 11, 1987

[54] PET OPERABLE ANNUNCIATOR

[76] Inventor: Richard W. German, 1823 Prelude Dr., Vienna, Va. 22180

[21] Appl. No.: 894,200

[22] Filed: Aug. 7, 1986

[51] Int. Cl.$^4$ .............................................. G08B 3/00
[52] U.S. Cl. .................................... 340/328; 340/329; 340/330; 340/573; 340/384 E; 200/61.62; 119/1
[58] Field of Search ............... 340/328, 329, 330, 321, 340/384 R, 384 E, 573, 286 R, 548, 549; 200/61.62, 61.58 R, 61.81, 61.82, 61.85; 119/1, 29

[56] References Cited

U.S. PATENT DOCUMENTS 4,400,696  8/1983  Klingensmith ...................... 340/573

Primary Examiner—Donnie L. Crosland
Attorney, Agent, or Firm—Peter L. Klempay

[57] ABSTRACT

An annunciator or signal which can be mounted adjacent a door and actuated by a pet to signal its desire to be let in or out includes a housing with an opening in the lower front thereof and with a lever projecting outwardly through the opening. When a pet presses the lever, switch within the housing is closed to actuate a chime or the like.

6 Claims, 6 Drawing Figures

U.S. Patent    Aug. 11, 1987    Sheet 1 of 2    4,686,504
FIG. 1
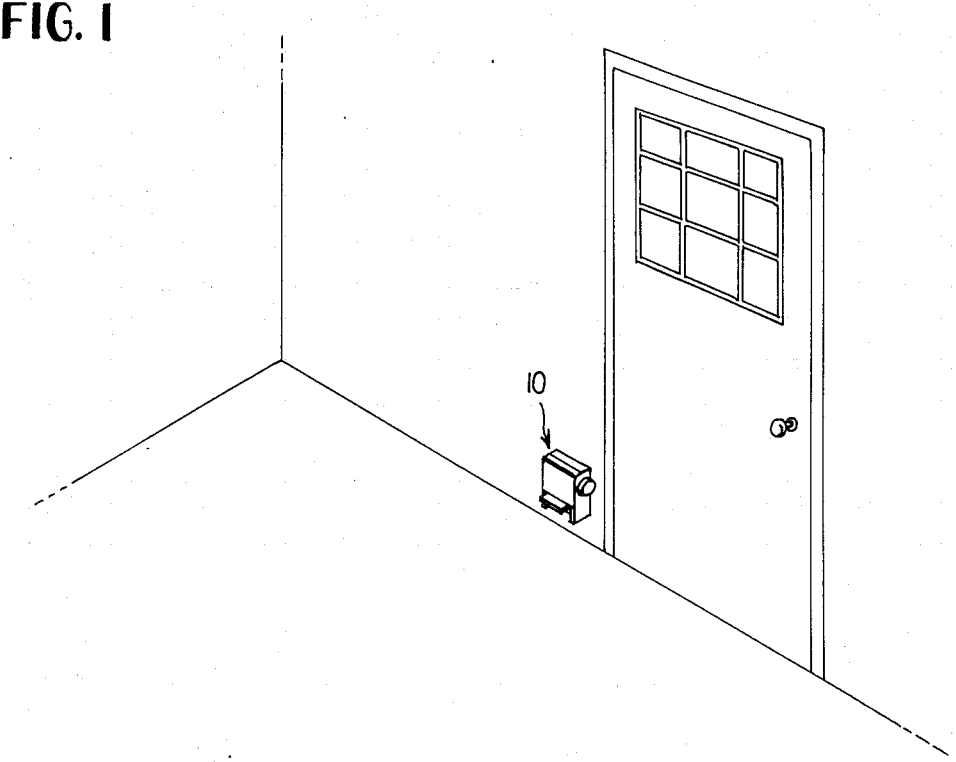
FIG. 2
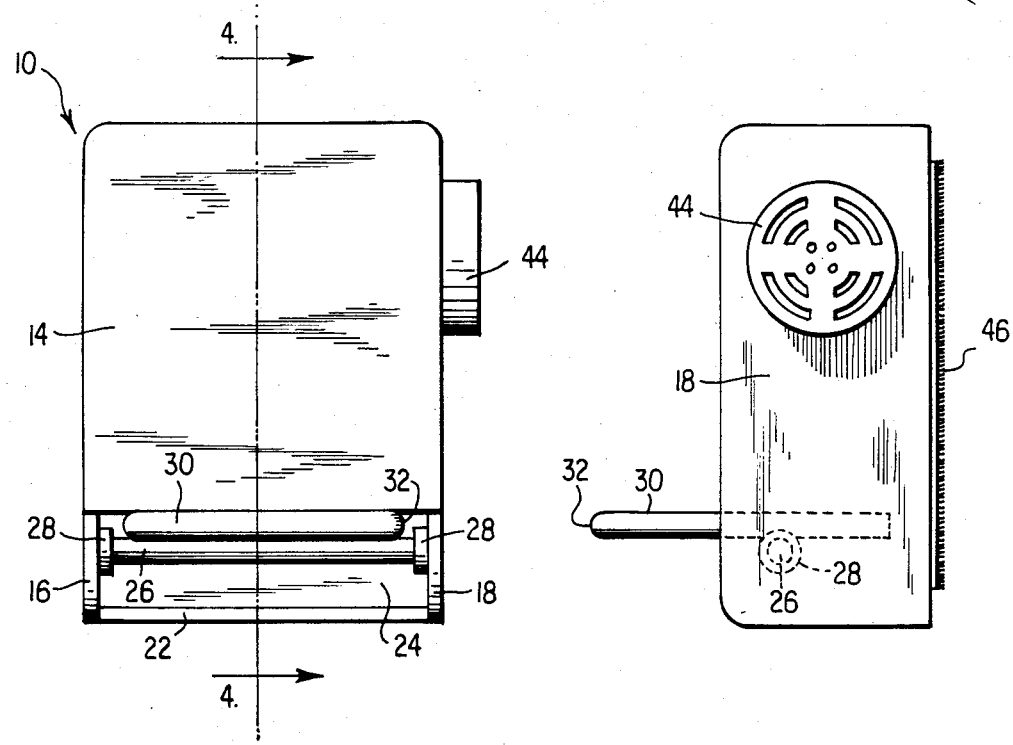
FIG. 3

TO CORRESPONDING LEADS
OF SWITCH 36

PET OPERABLE ANNUNCIATOR

The present invention pertains to annunciators or signals which are operable by animals such as house pets and, more particularly, to such a device which may be used by an animal to signal its desire to be let in or out.

BACKGROUND OF THE INVENTION

Cats and dogs which are house pets will normally indicate their desire to be let into or out of the house by meowing or barking or by scratching at the door. The former can be annoying to neighbors and others and is not always effective as the pet owner may attribute it to other reasons. Scratching can result in damage to the door and, thus, is not desirable. The provision of a pet door is not always an effective solution as such a door permits unrestricted egress and ingress by the pet and by other small animals and as the pet owner may not want or be permitted to install such a door. In order to provide a signalling means usable by the pet which avoids the above problems, pet operable doorbells have been proposed. One such doorbell operator, shown in *Popular Science*, May 1952, page 194, includes a spring-loaded platform with switch contacts and is intended to be placed beside the door with the pet being trained to sit on the platform thereby closing the contacts to actuate the household doorbell. As this device is connected to the existing doorbell wiring, however, it is not readily portable or suitable for use at a door not equipped with a bell. Also, when the device is placed out of doors and intended for use by a relatively small animal, snow accumulation and the like may also actuate the switch.

It is the primary object of the present invention to provide a pet operable signalling device in the form of a self-contained unit, not requiring connection to a household doorbell or other wiring.

A further object of the present invention is the provision of such a pet operable signalling device which is readily portable.

Another object of the invention is the provision of such a device which is characterized by its simplicity of construction and ease of operation.

SUMMARY OF THE INVENTION

The above and other objects of the invention which will become apparent hereinafter are achieved by the provision of a pet operable annunciator including a housing adapted to be mounted adjacent a door, preferrably removeably, and having front, rear, top, bottom and side walls, the lower portion of the front wall and the forward portion of the bottom wall being cut away to provide an opening therethrough; a shaft journalled in the side walls; a lever carried by the shaft and projecting outwardly through the opening; a counterbalancing weight connected to the lever rearwardly of the shaft whereby the lever is normally substantially horizontal; a switch also connected to the lever, the switch being open when the lever is in its normal position and closing upon depression of the forward end thereof; a battery; and a chime, buzzer or the like connected in series with the switch and the battery. A second unit of similar construction but lacking a battery or chime may be provided for use on the opposite side of the door, the switch of this unit being connected in parallel with the switch of the first unit.

For a more complete understanding of the invention and the objects and advantages thereof, reference should be had to the accompanying drawings and the following detailed description wherein a preferred embodiment of the invention is illustrated and described.

DESCRIPTION OF THE DRAWINGS

In the drwings:

FIG. 1 is a pictorial view showing the pet operable annunciator of the present invention mounted to a wall adjacent to a door;

FIG. 2 is a front elevational view of the unit;

FIG. 3 is a side elevational view of the unit;

DESCRIPTION OF THE PREFERRED EMBODIMENT

Figure 4:
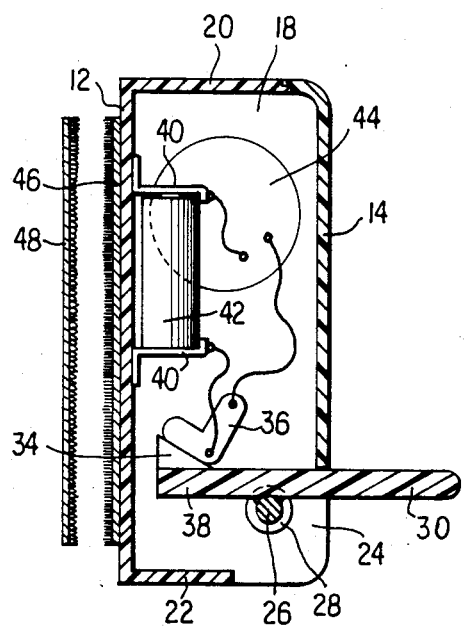
FIG. 4 is a transverse cross sectional view taken on the line 4—4 of FIG. 2.

Referring to FIGS. 2-4, the pet operable annunciator of the present invention, designated generally by the reference numeral 10, includes a housing with a back wall 12, front wall 14, side walls 16 and 18, top wall 20 and bottom wall 22. The front wall is shorter than the back wall and the bottom wall, shorter than the top wall thus forming an opening 24 at the lower front of the housing. Preferably, the front wall is removable to permit access to the interior of the housing. A shaft 26, received in bosses 28 formed in the side walls 16, 18, extends horizontally across the housing, parallel to the front wall thereof, the shaft being located inwardly of the front wall and downwardly by a short distance from the lower end thereof. Journalled on shaft 26 is a lever 30 which is of a width slightly less than that of the opening 24 and of a length such as to project forwardly of the housing by one or two inches. The outwardly projecting forward corners 32 of the lever are, preferrably, rounded. The lever also extends rearwardly of the rod or shaft 26 with a counterweight 34 and a mercury switch 36 being mounted on the rearward extension 38. Also contained within the housing are a pair of clips 40 for holding and establishing electrical contact with a battery 42. An electrically operated buzzer or chime 44 is mounted within the housing or externally on one of the walls thereof. The rear face of the back wall 12 of the housing is, preferrably, provided with one or more strips 46 of fastening material of the hook and loop type (such as that sold under the trademark VELCRO). Additional strips 48 of mating fastening material with an adhesive backing are provided for attachment to a wall surface or the like to which the unit is to be mounted.

Figure 5:
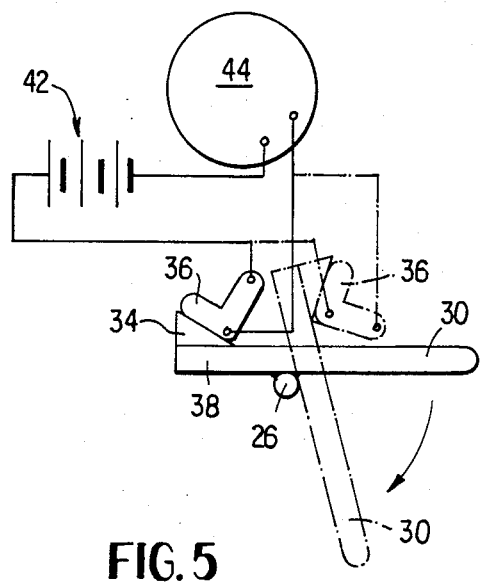
FIG. 5 is a schematic showing of the electrical circuit of the device.

As is shown in FIG. 5, the contacts 50 of the mercury switch 36 are open when the lever 30 is in its normal or horizontal position and close when the forward end of the lever is moved downwardly. As the switch 36 is connected in series with the battery 42 and chime or buzzer 44, closing of the switch actuates the chime or buzzer.

The device 10 is intended to be mounted, as is shown in FIG. 1, on a wall adjacent the door through which the pet enters and exits. The vertical placement of the device relative to the floor is determined by the size of the animal and is selected so that the animal can reach and depress the lever 30 with its paw. By doing so, the pet actuates the chime or buzzer, thereby signalling its desire to go out or in. The lever 30, being counterbalanced by the weight 34, automatically returns to the horizontal position deactivating the alarm when released. Since, as is shown in phantom outline in FIG. 4, the lever can pivot to a substantially vertical position, the pet's paw will slide off the lever so that the activation is momentary. This arrangement also serves to protect the device from excessive force such as that which would be encountered when a relatively large dog paws the lever.

Figure 6:
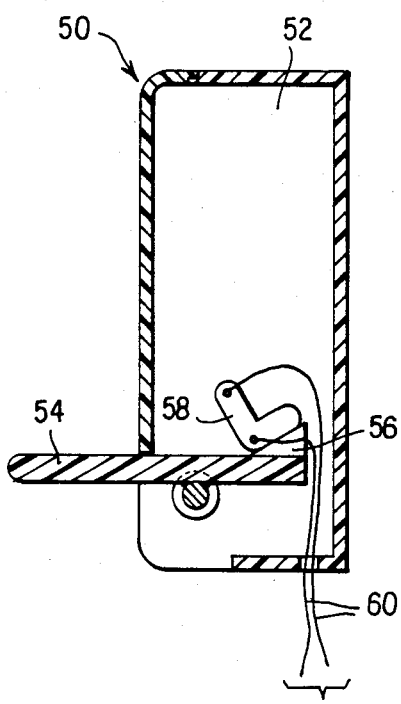
FIG. 6 is a schematic showing of an alternate embodiment of the pet operable annunciator of the present invention.

When it is desired to provide signalling means for the pet on both sides of the door, a second unit 50 is mounted adjacent the opposite side of the door. This unit 50, shown schematically in FIG. 6, is of similar construction to the device 10, having a housing 52 with a pivotally mounted lever 54, counterbalance 56 and mercury switch 58. Omitted from the second unit, however, are the battery and chime or buzzer. The mercury switch 58 is connected in parallel with the switch 36 of the first unit by means of wires 60 so that actuation of either switch causes the alarm to sound.

As the device is actuated by the normal pawing or scratching action of the pet, relatively little training is required to teach the use of the alarm. Preferably, the housing is of a color or color pattern which contrasts with the surroundings so as to be quickly reconizable by the pet. Likewise, the lever may be of contrasting appearance to that of the housing. Such readily discernable surface ornamentation is desirable in light of the color blindness of dogs and cats. The use of hook and loop type fastening means to secure the device in place allows the device to be readily relocated when desired and does not require any permanent alteration of the door or wall structure.

While a preferred embodiment of the invention has been illustrated and described in detail herein, it will be understood that changes and additions may be made therein and thereto without departing from the spirit of the invention. Reference should, accordingly, be had to the appended claims in determining the true scope of the invention.

I claim:

1. A pet actuatable annunciator adapted for installation adjacent a door comprising:
   a housing having top, bottom, side, front and rear walls, said front wall being shorter than said rear wall and said bottom wall being shorter than said top wall thereby providing an opening at the lower front of said housing;
   a shaft carried by said side walls and extending vertically across the interior of said housing parallel to said front wall thereof, said shaft being located inwardly of and below the upper edge of said opening;
   a lever mounted on said shaft for pivotal movement relative to said housing and having a forward end projecting outwardly through said opening and a rear end extending rearwardly of said shaft;
   a counterweight carried by said rear end of said lever;
   a switch operated by said lever, said switch being open when said lever is in its normal position and closing upon depression of said forward end thereof;
   a battery within said housing; and
   an electrically operated annunciator mounted on said housing and connected in series with said battery and said switch.

2. The pet actuatable annunciator of claim 1 wherein said switch comprises a mercury switch.

3. The pet actuatable annunciator of claim 2 wherein said mercury switch is mounted on said rear end of said lever.

4. The pet actuatable annunciator of claim 1 further including means carried by said rear wall of said housing for detachably securing said housing to a surface adjacent said door.

5. The pet actuatable annunciator of claim 1 further including a second housing, shaft, lever, counterweight and switch, said second switch being connected in parallel with said firstmentioned switch.

6. The pet actuatable annunciator of claim 1 further characterized in that said housing and said lever are provided with surface ornamentation readily discernable by the pet.

* * * * *